June 25, 1940.  G. V. RYLSKY  2,205,544
INCLINOMETER
Filed Jan. 20, 1938
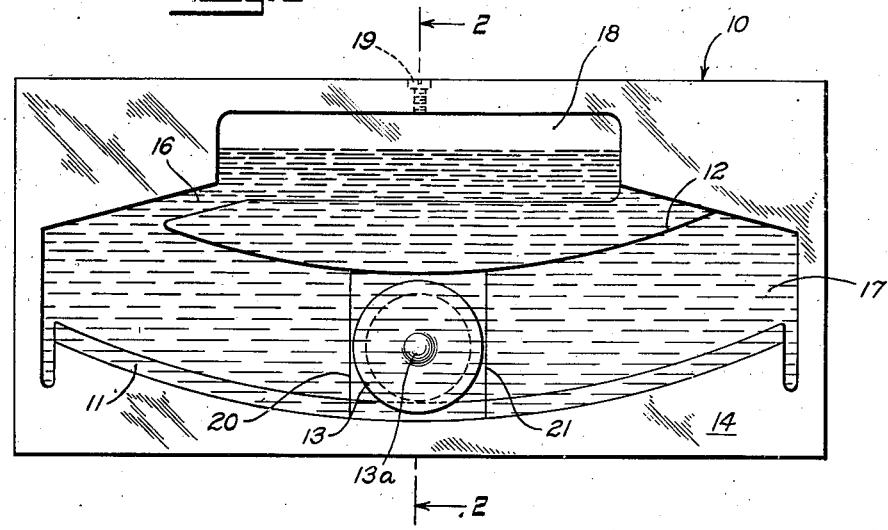
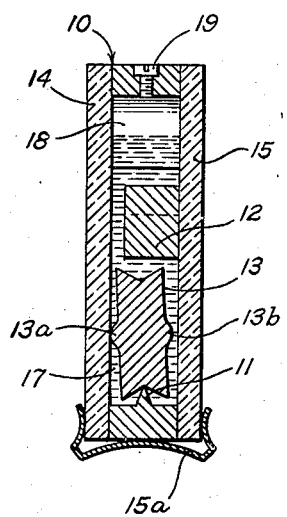
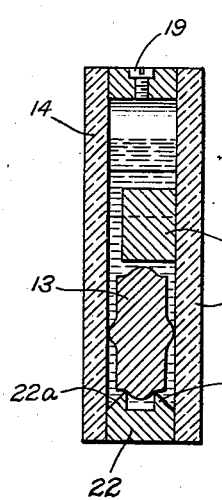
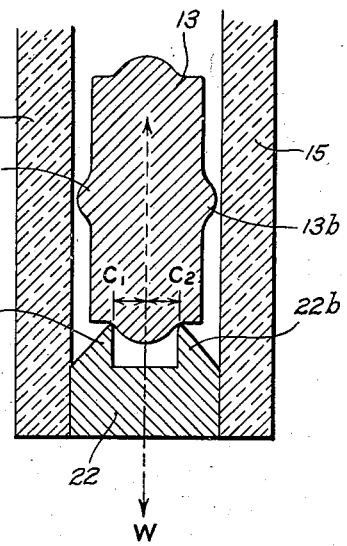
INVENTOR.
Gregory V. Rylsky
BY Stephen Cerstvik
ATTORNEY.

Patented June 25, 1940

2,205,544

UNITED STATES PATENT OFFICE 2,205,544

INCLINOMETER

Gregory V. Rylsky, New York, N. Y., assignor to Bendix Aviation Corporation, South Bend, Ind., a corporation of Delaware Application January 20, 1938, Serial No. 185,972

8 Claims. (Cl. 33—206)

The present invention relates to inclinometers and more particularly to inclinometers of the gravity actuated type adapted for use on aircraft to indicate lateral inclination or bank.

Inclinometers of the above general type, as constructed at present, consist of an arcuately curved and transparent glass tube, containing a steel ball immersed in a suitable damping liquid, the tube being sealed at both ends. The glass tube is adapted for mounting on an instrument board of an aircraft and in a vertical plane transversely of the aircraft with the ball in the center of the tube whereby upon inclination of the craft about its fore and aft axis, the ball is caused to roll by gravity toward one end or the other of the tube, the liquid acting to slow up and dampen the action of the ball. A clearance is provided between the ball and the interior of the tube to permit the liquid to flow freely around the ball when the latter is rolling in the tube.

In such devices, however, there is considerable rolling friction inasmuch as not only does the ball come into contact with the entire bottom of the tube but there is also considerable contact between the ball and the sides of the tube. This is particularly true because the tube is also circular in cross-section. Further, the action of a rolling ball in contact with a curved surface is similar to that of a series of discs, fixedly carried side by side on the same axis, these discs having different diameters. Considering two of these discs, one of large and one of smaller diameter, upon rotation thereof, the disc of smaller diameter will slide as well as roll as it can make only the same number of revolutions as the larger diameter disc but has to traverse the same linear distance with only one revolution thereof.

Further, such inclinometers of the ball type have many imperfections inherent in their type of construction. With the use of the ball type rolling element, the instrument casing must be made of considerable thickness, thereby increasing its weight and making the mounting thereof in an instrument board more difficult.

The use of a curved glass vessel produces optical conditions which are undesirable, especially upon artificial illumination thereof, such as distortion of the image of the ball, and glare caused by the reflection from the curved surface.

Due to the difficulty encountered in producing an accurately curved glass container, the accuracy of movement of the ball thereover, is reduced due to inequalities in the curvature and irregularities of the structure of the glass container. A side creeping of the ball also occurs under vibration which is highly undesirable.

Accordingly, one of the objects of the present invention is to provide a novel inclinometer, whereby the foregoing undesirable characteristics are eliminated.

Another object of the present invention is to provide a novel inclinometer, wherein sliding friction is practically eliminated and rolling friction is considerably reduced.

Still another object is to provide a novel inclinometer, whereby the thickness of the instrument is considerably reduced.

A further object is to provide a novel inclinometer of lesser thickness in which the area of the object observed is not decreased.

Still another object is to provide a novel inclinometer having such optical properties that observation and illumination thereof are greatly facilitated.

A further object is to produce a novel inclinometer of greater accuracy than heretofore, which can be cheaply reproduced.

Another object is to provide a novel inclinometer whose contacting parts comprise cooperating rails and discs easily machined to great precision whereby the inaccuracies of former inclinometers are obviated.

A further object is to provide a novel inclinometer of the gravity actuated type whereby the ball is replaced by a rolling disc.

The above and other objects and advantages of the invention will appear more fully hereinafter from a consideration of the detailed description which follows, taken in connection with the attached drawing wherein one embodiment of the invention is illustrated. It is to be expressly understood, however, that the drawing is for the purpose of illustration and description only and is not designed as a definition of the limits of the invention, reference being had for this purpose to the appended claims.

In the drawing wherein like reference characters refer to like parts throughout the several views:

Fig. 1 is a side elevation of an inclinometer illustrating an embodiment of the invention;

Fig. 2 is a section taken on line 2—2 of Fig. 1;

Fig. 3 is a sectional side view of a modified form of the novel device; and

Fig. 4 is a diagrammatic representation of the restoring operation of the device as in Fig. 3.

Referring to the drawing and more particularly to Fig. 2, the novel device of the present invention comprises a hollow flat rectangular casting 10, formed to provide a curved track or rail 11 on the inside thereof, above and parallel to which is formed a guide 12 integral with the casting and curved in conformance with the curvature of track 11, thereby providing a curved runway of limited extent within which is located the flat disc 13, arranged to roll upon and coact with track 11 so that said disc rolls upon said track upon inclination of the casting. The guide 12 prevents the disc 13 from being dislodged from its track 11. On both sides of the casting are cemented the cover glasses 14 and 15, made of a transparent material so that the disc 13 is visible therethrough. Protuberances 13a and 13b on the sides of the disc individually touch and slide upon one of the glass walls but this single point contact is not sufficient to cause friction to an extent whereby the accuracy of rolling will be affected. Spring elements 15a may be provided to hold the device in assembled position. A suitable type of passage such as 16 is provided to connect the compartment 17 with a suitable liquid expansion chamber such as 18 formed in the casting 10. A filling opening provided with a closure 19 is located at the top of the casting, through which the compartment 17 is filled with a damping fluid by means of chamber 18 and passage 16. The chamber 18, however, is not filled completely, as a space must be provided above the liquid level therein for expansion of the liquid upon changes of temperature thereof.

Reference lines 20 and 21 are provided on glass 14 or on both cover glasses 14 and 15 in order to indicate when the disc is in the center of the device and the craft upon which the device is mounted is perfectly level or properly banked in case of a turn.

Upon the departure of the craft, upon which the inclinometer is mounted, from a horizontal position, provided said departure is caused by movement about the fore and aft axis of the craft, the disc 13 will roll to that side of the craft which is below the horizontal thereby indicating the position of the craft in space. The disc rolls through the liquid with but a minimum of rolling contact between said disc and the track and infinitesimal sliding friction between one of the protuberances 13a and 13b of the disc and the respective wall 14 or 15. Due to the higher available accuracy of machining with which the novel parts can be produced, a highly sensitive indication of the inclinometer is presented, greatly exceeding that of the ordinary ball type of device.

Referring to Fig. 3, a modification of the device as illustrated in Fig. 2 is shown therein. The track 11 of the device of Fig. 2 is replaced by the element 22 providing two sharp parallel rails 22a and 22b over which the disc 13 now rotates. By means of the parallel rails the disc 13 is maintained in such a position that the protuberances 13a and 13b no longer contact the cover glasses 14 and 15 except upon pitching of the craft. Even during such pitching the friction is reduced due to the restoring moment produced by the novel structure as will now be explained in detail.

Referring to Fig. 4, W represents the weight of the disc 13, $c_1$ represents the effective lever arm of the weight with respect to rail 22a and $c_2$ represents the lever arm of the weight with respect to rail 22b. Upon a pitching of the craft whereby the nose is lowered, the weight W acting through the lever arm $c_2$ operates as a restoring moment to reduce the pressure of the disc protuberance 13b upon the glass 15. This restoring moment will be exerted as long as the direction of the force due to the weight does not pass through the support point about which the disc is pivoting. Upon an elevation of the nose of the craft the moment $Wc_1$ is available to reduce the friction of protuberance 13a upon cover glass 14 in the same manner as was described for the restoring moment $Wc_2$.

There is thus provided a novel inclinometer of the gravity actuated type wherein the sensitivity of the device is greatly increased and the accuracy thereof is highly improved.

Although but two embodiments of the invention have been illustrated and described, further changes and modifications in form, material and relative arrangement of parts which will now appear to those skilled in the art, may be made without departing from the scope of the invention. Reference is therefore to be had to the appended claims for a definition of the limits of the invention.

What is claimed is:

1. An inclinometer comprising an enclosure, a sharp surface providing a track within said enclosure, and a gravity actuated element mounted on said track, said element comprising a disc and protuberances extending from the sides of said disc.

2. An inclinometer including a curved track, the contact surface of said track comprising a plurality of sharp parallel edges, and a gravity actuated disc element mounted for rolling friction over said track, said element comprising a solid cylindrical disc and a continuous extension projecting from the periphery of said disc and extending between a pair of said edges.

3. An inclinometer comprising a container, a curved knife-edged track formed within said container, a guide, spaced from said track and conforming in configuration thereto, a disc mounted for rotation over said track in the space between said track and guide, a liquid surrounding said disc and filling said space between said track and said guide, an expansion chamber, a communicating passage between said space and said expansion chamber, and means forming a window in said container whereby the position of said disc may be observed.

4. An inclinometer comprising a hollow casting, a curved surface within the hollow of said casting forming a knife-edged track, a curved surface spaced from said track and cooperating therewith to form a guide, a wall sealing one side of said casting, a transparent member sealing the other side of said casting to form a completely closed container, a zero indicating element on said member, an opening in said casting leading to the space between said track and said guide, removable means for sealing said opening, a rolling flanged disc mounted for rotation on said track and a fluid filling the space between said track and said guide.

5. An inclinometer comprising an enclosure, two parallel sharp edges providing a track in said enclosure, a disc mounted for rotation over said track, means extending from said disc preventing lateral motion with respect to said track and protuberances extending from the sides of said disc.

6. In a device of the character described, a casting, a surface within said casting comprising a knife-edged curved track, an element displaced from said track and defining a space between said element and said track, a rolling disc mounted for rotation on said track in a longitudinal plane, means preventing lateral motion of said disc, an expansion chamber formed in said casting and connecting with said space, a wall sealing one side of said space, another wall containing observation means sealing the other side of said space to form a completely sealed container, an opening in said casting leading to said expansion chamber, a screw plug closing said opening and a fluid filling said space to provide means damping the rolling motion of said disc.

7. An inclinometer comprising a single curved knife-edged runway, walls forming observation means enclosing said runway and a single smooth-edged disc mounted on said runway for rolling motion back and forth in one plane only, said disc being so curved with respect to said runway as to present substantially point contact therewith.

8. An inclinometer comprising a body member, a passage-way formed in said member having a curved surface of large diameter, a projecting portion on said surface forming a curved track, a rolling smooth-edged disc of relatively small diameter, a peripheral slot formed in said disc, said disc being mounted on said curved surface with said projecting surface projecting into said slot whereby rolling motion back and forth in one plane only is permitted, means encircling said passage-way containing a window in one part thereof whereby the motion of said disc may be observed, and a fluid surrounding said disc.

GREGORY V. RYLSKY.